[12] United States Patent
Dravnieks et al.

(10) Patent No.: US 7,694,286 B2
(45) Date of Patent: Apr. 6, 2010

(54) APPARATUS AND METHOD FOR DETECTING BASE-REGISTER USAGE CONFLICTS IN COMPUTER CODE

(75) Inventors: John Robert Dravnieks, Kardinya (AU); John Robert Ehrman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 11/055,264

(22) Filed: Feb. 10, 2005

(65) Prior Publication Data

US 2006/0179424 A1 Aug. 10, 2006

(51) Int. Cl.
*G06F 9/44* (2006.01)
(52) U.S. Cl. .................... 717/143; 717/112; 717/126
(58) Field of Classification Search ................. 717/153, 717/161
See application file for complete search history.

(56) References Cited

U.S. PATENT DOCUMENTS

| | | | |
|---|---|---|---|
| 4,739,470 A | 4/1988 | Wada et al. | |
| 5,075,849 A | 12/1991 | Kuriyama et al. | |
| 5,488,714 A * | 1/1996 | Skidmore | 717/143 |
| 5,526,499 A * | 6/1996 | Bernstein et al. | 712/216 |
| 5,581,762 A | 12/1996 | Hayashi et al. | |
| 5,613,121 A * | 3/1997 | Blainey | 717/151 |
| 5,630,157 A * | 5/1997 | Dwyer, III | 712/23 |
| 5,774,722 A | 6/1998 | Gheith | |
| 5,832,533 A * | 11/1998 | Agarwal et al. | 711/2 |
| 5,836,014 A * | 11/1998 | Faiman, Jr. | 717/156 |
| 5,951,670 A * | 9/1999 | Glew et al. | 712/23 |
| 6,151,705 A * | 11/2000 | Santhanam | 717/153 |
| 6,167,509 A * | 12/2000 | Sites et al. | 712/237 |
| 6,189,086 B1 * | 2/2001 | Yamaura | 712/205 |
| 6,243,864 B1 | 6/2001 | Odani et al. | |
| 6,317,872 B1 | 11/2001 | Gee et al. | |
| 6,550,005 B1 | 4/2003 | Hill | |
| 6,581,130 B1 * | 6/2003 | Brinkmann et al. | 710/306 |
| 6,813,705 B2 * | 11/2004 | Duesterwald et al. | 712/216 |
| 2001/0032306 A1 * | 10/2001 | Duesterwald et al. | 712/216 |
| 2002/0049895 A1 * | 4/2002 | Inoue | 712/217 |
| 2002/0078010 A1 * | 6/2002 | Ehrman et al. | 707/1 |
| 2005/0216711 A1 * | 9/2005 | Butcher et al. | 712/233 |

FOREIGN PATENT DOCUMENTS

JP 3070038 3/1991

OTHER PUBLICATIONS

Brad Calder, Chandra Krintz, Simmi John, Todd Austin, "Cache-Conscious Data Placement".
"Research Disclosure", Sep. 1998/1291.
"Technical Disclosure Bulletin", RA892-0178.

* cited by examiner

*Primary Examiner*—Tuan Q Dam
*Assistant Examiner*—Isaac T Tecklu
(74) *Attorney, Agent, or Firm*—Kunzler Needham Massey & Thorpe (57) ABSTRACT

An apparatus for detecting base-register usage conflicts in computer code includes a parsing module configured to parse source code, an identification module configured to identify statements in the source code that reference a base register for address resolution according to base-displacement form, and a determination module configured to determine whether a base register referenced by one statement matches the base register referenced by another. If two statements do reference the same register, an apparatus and method in accordance with the invention may notify a user such that corrective action may be taken.

11 Claims, 7 Drawing Sheets

SOURCE STATEMENT

```
                   104  106
ADD2     CSECT
         L         1,16(,15)    Load 1st no. into R1
102      L         2,20(,15)    Load 2nd no. into R2
108      AR    110 1,2      112 Get sum in R1
         ST        1,24(,15)    Store sum
114      BCR   118 B'1111',14   Return to caller
         DC        F'4'     116 Fullword initially 4
         DC        F'6'         Fullword initially 6
         DS        F            Rsrvd only, no init
         END       ADD2
```

| SOURCE STATEMENT | | |
|---|---|---|
| ADD2 | CSECT | |
| 202 — LR | 12,15 | Copy addr of 1st inst |
| L | 1,20(,12) 106 | Load 1st no. into R1 |
| L | 2,24(,12) 112 | Load 2nd no. into R2 |
| AR | 1,2 | Get sum in R1 |
| ST | 1,28(,12) 116 | Store sum |
| BCR | B'1111',14 | Return to caller |
| DC | F'4' | Fullword initially 4 |
| DC | F'6' | Fullword initially 6 |
| DS | F | Rsrvd only, no init |
| END | ADD2 | |

APPARATUS AND METHOD FOR DETECTING BASE-REGISTER USAGE CONFLICTS IN COMPUTER CODE

BACKGROUND OF THE INVENTION

1. Field of the Invention

This invention relates to assembly language and more particularly to apparatus and methods for detecting conflicts between assembly language statements that specify the same base register for address resolution.

2. Description of the Related Art

Unlike many programming languages, assembly language is not a single language, but typically refers to a group of languages. This is because most processor families usually have a unique instruction set and thus their own assembly language.

Unlike higher-level languages, data and program structures written in assembly language are normally implemented directly on the underlying hardware. As a result, there is often a one-to-one correspondence between symbolic instructions and executable machine codes in many assembly languages. Nevertheless, assembly languages may also include directives to the assembler, directives to the linker, directives for organizing data space, and macros, which may translate into more than one machine instruction, or alternatively, not translate into any machine instruction at all.

Notwithstanding the obvious improvement in readability, assembly languages provide a number of significant advantages over machine code. For example, assemblers often perform bookkeeping and other tasks for the programmer. One important advantage of assemblers is their use of symbolic names to represent memory locations for data and machine instructions. This frees a programmer from the laborious task of computing and re-computing memory locations whenever a program is altered.

High Level Assembler ("HLASM") is IBM's assembler programming language and the assembler itself for the IBM z/OS, z/OS.e, OS/390, VM/ESA, z/VM, VSE/ESA, and z/VSE operating systems. Mainframes or other computers running these operating systems use an addressing scheme referred to as "base-displacement" addressing to compute the effective addresses of instruction operands of a program loaded into memory. In this scheme, effective addresses are computed by adding a "displacement" to a "base address." The base address is generally the address where the program is loaded into memory, although other addresses may serve as the base address. The displacement is the distance between the base address and the memory location where a particular instruction operand is found. Because locations inside the program relative to the program's base address do not change once a program is converted to machine code, displacements are fixed.

When a program is loaded into memory, the mainframe loads the base address of the program into one of its general purpose registers. When this occurs, the register is used as a "base register." At assembly time, a relative displacement is calculated for each operand, as is the base register number. The content of the base register is set at execution time, depending on the location in memory where the program is loaded.

As was previously mentioned, displacements of operands relative to the program's base address are generally fixed. However, if a programmer wishes to modify a program by inserting a statement, such as an instruction or directive, into the program source code, displacements of operands after the inserted statement are shifted relative to the program's base address in accordance to the size of the inserted statement. If the displacements are coded explicitly (i.e. using a numeric value to represent the displacement), this can be problematic since each displacement after the inserted statement needs to be recalculated relative to the program's base address.

To resolve this problem, HLASM allows a programmer to encode addresses implicitly with the USING statement. That is, addresses are represented symbolically by a label rather than by their explicit base-displacement form. When the assembler translates the program source code (written in assembly language) into object code (i.e., machine code), the assembler automatically calculates the displacement for each label and inserts these displacements into the object code. Thus, the assembler eliminates the need to recalculate new displacement values every time the program source code is modified.

In some situations, significant errors may occur if effective addresses are computed using the wrong base address. For example, such a situation may occur if two sections of program code that should operate with different base addresses use the same base register to calculate effective addresses, since a base register can only point to one base address at a time. If the base address is incorrect, the address of each operand within the program will also be incorrect.

In cases where an assembler fails to detect a conflict between two program sections that use the same base register from which to calculate effective addresses, the results can be catastrophic. Data may be read from or written to wrong locations in memory. Data may be permanently lost, overwritten, or corrupted. If this problem continues undetected, immense and potentially irreparable damage may occur.

Accordingly, what are needed are apparatus and methods for detecting conflicts in a program's source code or object code caused by two program sections using the same base register to compute effective addresses. What are also needed are apparatus and methods to notify a user or correct the conflict when detected. Further needed are specific apparatus and methods for detecting base-register conflicts for the instruction set provided for IBM's HLASM.

The present invention has been developed in response to the present state of the art, and in particular, in response to the problems and needs in the art that have not yet been fully solved by currently available apparatus, systems, and methods. Accordingly, the present invention has been developed to provide apparatus, systems, and methods for detecting base-register usage conflicts in computer code that overcome many or all of the above-discussed shortcomings in the art.

SUMMARY OF THE INVENTION

In certain embodiments, an apparatus for detecting base-register usage conflicts in computer code may include a parsing module configured to parse source code, an identification module configured to identify statements in the source code that reference a base register for address resolution according to base-displacement form, and a determination module configured to determine whether a base register referenced by one statement matches the base register referenced by another. In such an apparatus, address resolution in base-displacement form refers to an addressing methodology used by an assembler to compute base-displacement resolutions within the object code by calculating displacements relative to an address stored in a base register.

In selected embodiments, the apparatus may include a translation module configured to convert the source code into object code directly executable on a processor. The apparatus may also include a notification module to notify a user in response to several statements referencing the same base register for address resolution. In other embodiments, the apparatus may include a rectification module to initiate corrective action in response to several statements referencing the same base register.

In another embodiment in accordance with the invention, a system for detecting base-register usage conflicts in computer code includes a processor for processing executable and associated operational data and a memory device for storing the executable and associated operational data. The executable and operational data includes a parsing module configured to parse source code, an identification module configured to identify statements in the source code that reference a base register for address resolution according to base-displacement form, and a determination module configured to determine whether a base register referenced by one statement matches the base register referenced by another.

In certain embodiments, the memory device may also store various other modules, such as a translation module configured to convert the source code into object code, a notification module to notify a user in response to several statements referencing the same base register, and a rectification module to initiate corrective action in response to several statements referencing the same base register. As was previously mentioned, the statements may include USING statements that specify the same base register for address resolution. More particularly, a conflict may occur where both an ordinary USING statement and a labeled USING statement reference the same base register.

In another embodiment, a method in accordance with the invention may be embodied as a signal-bearing medium tangibly embodying a program of machine-readable instructions executable by a digital processing apparatus. These machine-readable instructions include operations for detecting base-register usage conflicts in computer code, namely an operation to parse source code, an operation to identify several statements in the source code that reference a base register for address resolution according to base-displacement form, and an operation to determine whether the statements both reference the same base register.

In certain embodiments, the machine readable instructions may include an operation to notify a user that several statements reference the same base register. As previously mentioned, these statements may include USING statements that specify a base register for address resolution, and more particularly, an ordinary USING statement and a labeled USING statement that reference the same base register.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides a novel apparatus, system, and method for detecting base-register usage conflicts. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As a preliminary matter, FIGS. 1 through 4 represent various fragments of program code that are included to illustrate the problem addressed by an apparatus and method in accordance with the present invention. As such, FIGS. 1 through 4 are merely exemplary in nature and are included to provide background and context to the present invention. Thus, the specific code and statements illustrated in FIGS. 1 through 4 are merely examples, and are in no way limiting of the various contexts in which the problem addressed by the present invention may arise. Indeed, the problem addressed herein may arise in various different configurations of program code and potentially using different assembly languages than the language illustrated herein.

Figure 1:
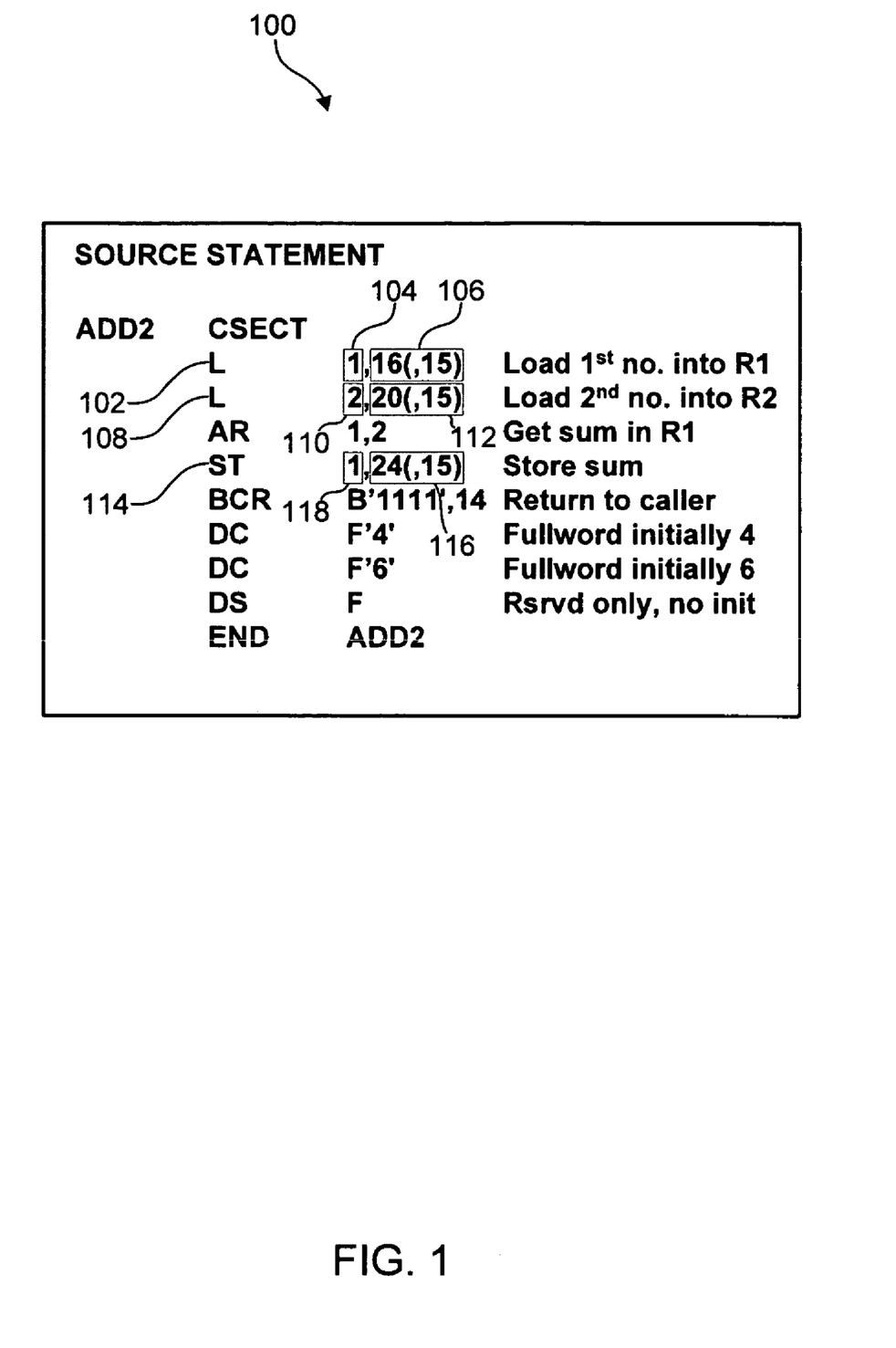
FIG. 1 is an exemplary fragment of program code illustrating several statements of assembly language using an explicit base-displacement addressing methodology.

Referring to FIG. 1, as was previously mentioned, some computers such as IBM mainframes use what is referred to as base-displacement addressing for many instruction operands. The base register number and a relative displacement with respect thereto is calculated at assembly time and is stored as part of an instruction. As was previously mentioned, the base register contents are set at execution time and depend on where the program is loaded into memory. The sum of the base register contents and the displacement provide an operand's effective address in memory. For example, if the displacement is 4 and the base register contains 0000007C (in hexadecimal), the effective address is 000080 (also in hexadecimal). When an address in the source language specifies the base and the displacement, it is typically referred to as an "explicit" address.

For example, base-displacement addressing may be illustrated by a sample program fragment 100. In IBM's high level assembler language ("HLASM"), a LOAD instruction 102 includes two operands 104, 106. When the instruction 102 is executed, the contents of the register indicated by the first operand 104 (here register one) are replaced by the contents located at an address in memory indicated by a second operand 106, which in this example is expressed explicitly in base-displacement form. Here, the address of the second operand 106 is calculated by adding a displacement (here sixteen) to the base address stored in base register fifteen. Likewise, another LOAD instruction 108 includes a pair of operands 110, 112. Like the previous example, the contents of the register indicated by the first operand 110 (here register two) is replaced by the contents located at the address indicated by the second operand 112. In this example, the address of the second operand 112 is calculated by adding the displacement (here twenty) to the base address stored in register fifteen.

Similarly, a STORE instruction 114 may perform the reverse of the LOAD instructions 102, 108. For example, the STORE instruction 114 may replace the contents located at an address in memory indicated by a second operand 116 with the contents stored in a register (here register one) indicated by a first operand 118. The address indicated by the second operand 116 is calculated by adding the displacement (here twenty-four) to the contents stored in base register fifteen. In the above examples, the addresses indicated by the operands 106, 112, 116 are coded explicitly rather than symbolically using labels as will be explained in more detail in the description of FIG. 3. For the purpose of this example, an explanation of other instructions listed in the program fragment 100 is unnecessary as the primary purpose of this example is to illustrate the use of base-displacement addressing of operands within the computer code 100.

Figure 2:
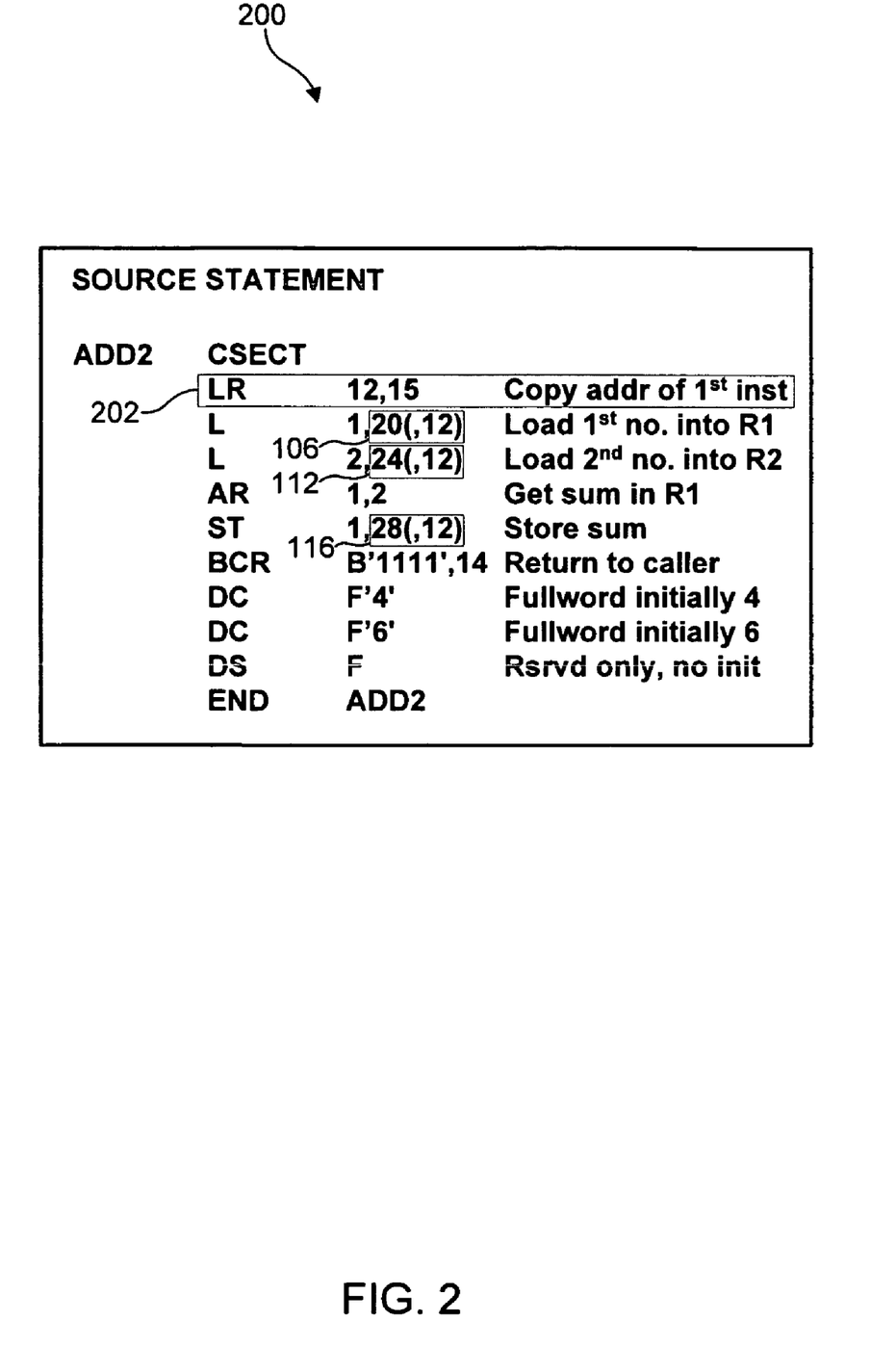
FIG. 2 is an exemplary fragment of program code illustrating the effect that inserting a line of program code has on explicit addresses within the program fragment.

Referring to FIG. 2, although a programmer may represent addresses in explicit base-displacement form, a problem may occur if a programmer attempts to add a statement or a line of code to the program code. Such an insertion may move each line of code after the insertion down such that data areas are shifted with respect to the base address of the program code. Each of the explicit displacements after the insertion will be incorrect and will need to be modified to refer to a desired data field or address in memory.

For example, in a modified program fragment 200, a statement 202 may be inserted into the program code that loads the base address from register fifteen into register twelve, thereby making register twelve the new base register. In this example, the programmer would have to change each reference to register fifteen in the operands 106, 112, 116, to register twelve. Moreover, because the statement 202 shifts each instruction after the statement 202 with respect to the beginning, or base address, of the program fragment 200, the programmer needs to modify each of the displacement values (now represented as twenty, twenty-four, and twenty-eight) to account for the shift. Because a program may be changed many times and contain thousands of operands pointing to various address locations, the task of calculating and re-calculating new explicit displacement values would be very time-consuming and infeasible.

Figure 3:
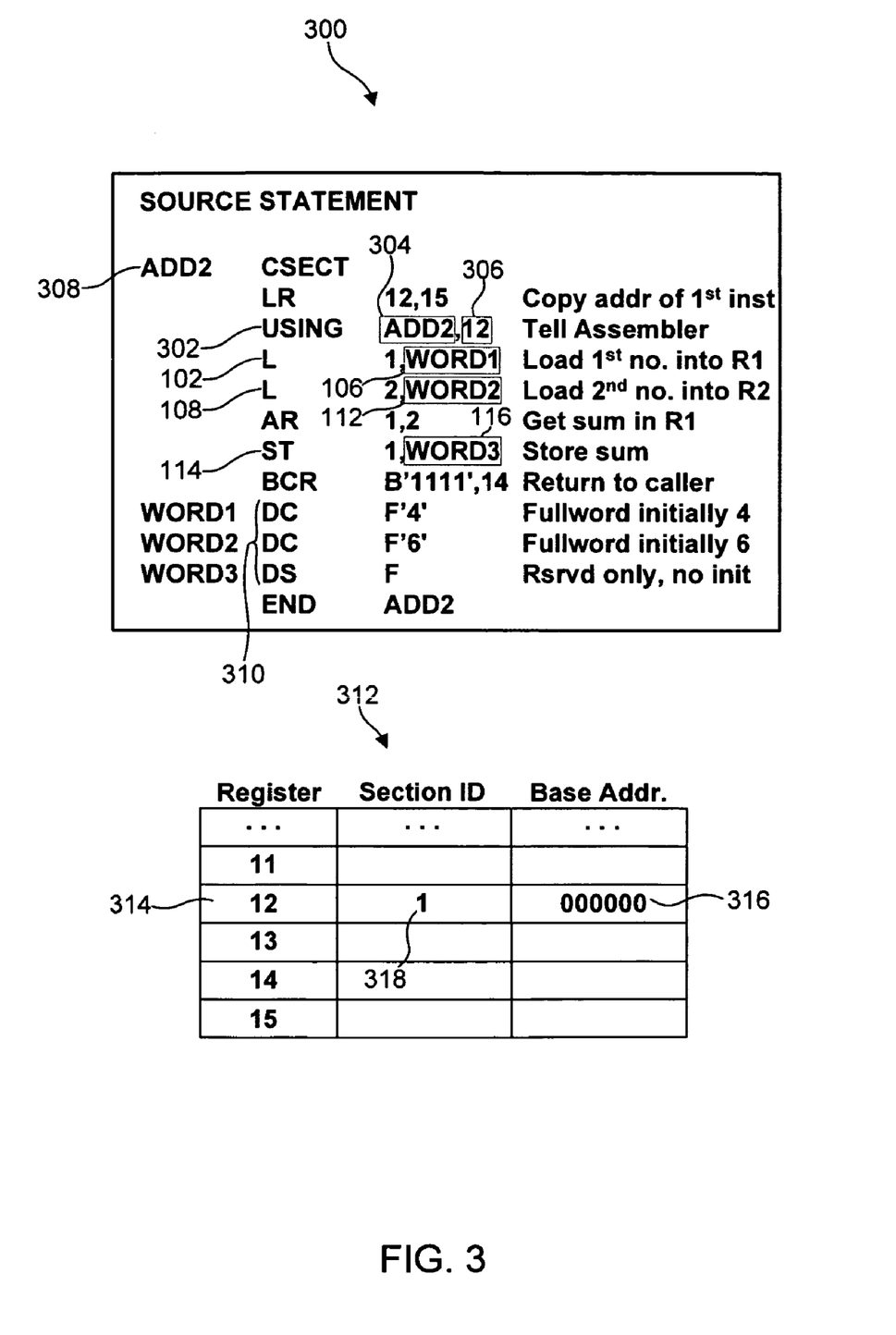
FIG. 3 is an exemplary fragment of program code illustrating the advantage of using a USING statement to represent addresses symbolically rather than explicitly.

Referring to FIG. 3, to address the above-mentioned problem with explicit addresses, various assembly languages allow a programmer to represent addresses symbolically rather than explicitly. For example, HLASM allows programmers to represent addresses symbolically using labels (i.e., implicit addresses) as long as the base register and base address are specified. Thus, instead of referring to addresses explicitly, a programmer may simply refer to a storage area with a label. A programmer may then use the label to refer to the storage area in any instruction that references the storage area. At assembly time, the assembler converts implicit addresses into a valid base and displacement in the machine code. In HLASM, the USING instruction allows a user to represent addresses symbolically.

In the illustrated program fragment 300, a USING statement 302 may be inserted to establish addressability in the fragment 300. An assembler uses the USING statement to verify that symbolic address in the program code share the same relocatability as the program's base address, calculate possible displacements from the base address for instructions in the program code, and select displacements for each instruction in addition to the specified base register. As illustrated, the traditional USING statement 302 specifies a base address 304 and a base register 306 which, in this example, refer to the label "ADD2" and register twelve, respectively. The label "ADD2" 308 symbolically represents the base address of the program fragment 300.

To keep track of USING statements that specify registers as base registers, the assembler maintains a base register table 312 that contains an entry 314 for each register. When the assembler encounters a USING statement 302 in the program code 300, the assembler locates the corresponding register entry 314 in the table 312 and records the base address 316 indicated by the USING statement 302 in the table 312. The assembler also assigns an identifying number 318 to each control section and this number 318, or "section ID" 318, is also recorded in the table 312.

As illustrated in program fragment 300, addresses in the operands 106, 112, 116 (previously expressed explicitly in base-displacement form in FIGS. 1 and 2) are replaced with labels (here WORD1, WORD2, and WORD3) to refer to the addresses symbolically. In this example, these labels correspond to data areas defined by various instructions 310 which reserve storage in the program 300. This method of using labels to represent addresses implicitly lets the assembler do the work of converting the labels into base-displacement form at assembly time, thereby freeing a programmer from the laborious task of computing and re-computing addresses.

Figure 4:
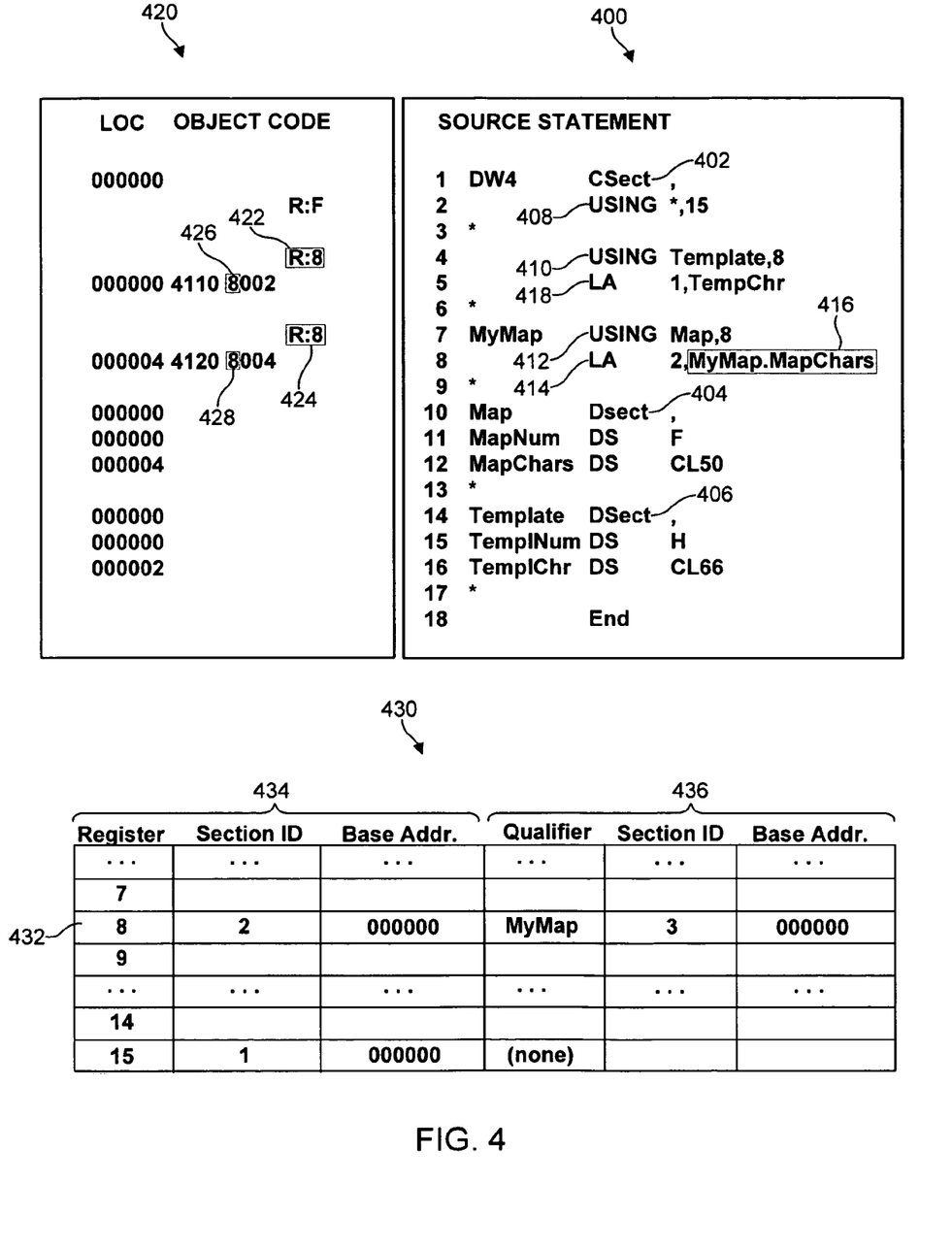
FIG. 4 is an exemplary fragment of program code illustrating the use of multiple USING statements to establish base-displacement resolution for several data structure templates.

Referring to FIG. 4, the present version of HLASM supports four types of USING statements which the assembler uses to resolve addresses from their symbolic to their base-displacement form. The first and most traditional type, as illustrated by the USING statement 302 in FIG. 3, is the ordinary USING statement which takes the following form:

USING base_address, register

HLASM also supports three newer types of USING statements: a labeled USING statement, a dependent USING statement, and a labeled dependent USING statement of the following form (listed in the same order as above):

qualifier USING base_address, register

USING base_address, addressable_expression qualifier USING base_address, addressable_expression The labeled USING requires the explicit designation of a register to be used to resolve symbolic addresses. The dependent and labeled dependent USING statements, however, only require an addressable expression in the second operand, meaning that each of these statements inherit their base register specification from a previous ordinary or labeled USING statement. References to symbolic expressions based on ordinary and labeled USING statements are distinguished by the use of the "qualifier." If a symbol is referenced without a qualifier, only ordinary or dependent USING statements are used as resolution candidates. Conversely, if a symbol is referenced with a qualifier, then only labeled or labeled dependent USING statements are used as resolution candidates. The use of a qualifier to distinguish between ordinary and labeled USING statements may be shown in a program fragment 400, as illustrated in FIG. 4.

For example, a program fragment 400 may include multiple USING statements to establish the addressability of various control sections of a program. For the purposes of this description, a control section refers to the smallest subdivision of a program that can be relocated as a unit. For example, a program fragment 400 may include a CSECT instruction 402 initiating an executable control section and one or more DSECT instructions 404, 406 establishing various dummy control sections. A CSECT instruction 402 is typically used to begin a program and appears before any executable instruction. A DSECT instruction 404, 406, may be used to describe the layout of data in a storage area without actually reserving any storage. That is, a DSECT instruction 404, 406 may be used to create templates that can be overlaid on selected areas of storage. These storage areas may then be referenced by the labels, or symbolic names, designated in the dummy sections. Although labels within a dummy control section (DSECT) carry the same attributes as those in a executable control section (CSECT), the assembler allocates no storage for a DSECT instruction 404, 406.

A first USING statement 408, in this example 400 an ordinary USING statement 408, may establish addressability for the control section 402. Likewise, another USING statement 410, here an ordinary USING statement 410, may establish addressability for a dummy control section 406. Similarly, another USING statement 412, such as a labeled USING statement 412 in this example, may be used to establish addressability for another dummy control section 404. As illustrated by a LOAD ADDRESS statement 414, if a symbol (here "MapChars") is referenced with the qualifier (here "MyMap") of the USING statement 412 (here resulting in the expression "MyMap.MapChars"), then the assembler only checks the USING statement 412 that has that qualifier as a resolution candidate. Otherwise, only ordinary USING statements are checked as resolution candidates.

As was previously mentioned, serious and potentially catastrophic errors may occur if two control sections reference the same base register for resolving addresses in base-displacement form. For example, as illustrated in the program fragment 400, the ordinary USING statement 410 and the labeled USING statement 412 both reference register eight as a base register. Upon examining the translated machine code 420, the resulting code shows that both the ordinary and labeled USING statements 410, 412 reference the same base register, namely register eight 422, 424. Moreover, the translated LOAD ADDRESS statements 414, 418 both show that register eight is used as the base register in calculating the effective addresses of their operands (indicated by the numerals 426, 428). Typically, if a programmer did not intend to use the same base register, such a mistake is known as a semantic error. That is, the programmer may have written the code intending to "mean" or accomplish one objective, while the code achieves something other than what the programmer intended.

The problem may also be observed by examining the base-register table 430. As illustrated, because the assembler keeps track of both ordinary and labeled USING statements in the same base-register table 430, and because only one entry 432 exists for each register, a conflict will occur if two different base addresses are stored in the same entry. The ordinary USING portion 434 of the base-register table 430 is used to resolve implicit addresses without a qualifier, and the labeled USING portion 436 of the base-register table 430 is used to resolve implicit addresses with a qualified symbol. Because a register may point to only one address at a time, this conflict may cause data to be read from or written to erroneous and unintended locations in memory, potentially causing severe data corruption or loss. Thus, apparatus and methods are needed to detect and remedy such a conflict before damage occurs.

Figure 5:
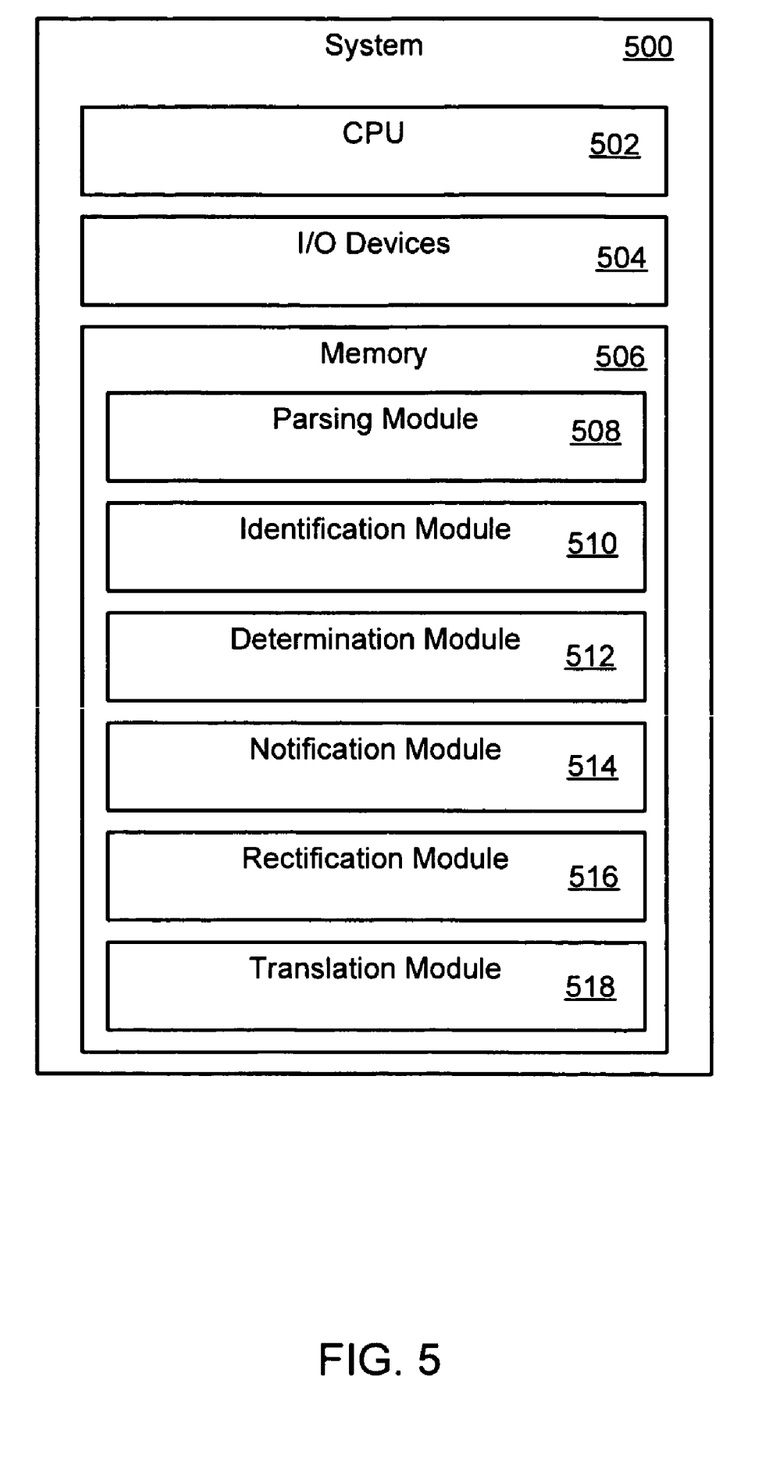
FIG. 5 is a schematic block diagram illustrating one embodiment of a system for detecting base-register usage conflicts in accordance with the invention.

Referring to FIG. 5, in certain embodiments in accordance with the invention, a system 500 for detecting base-register conflicts in computer code may include a processor 502, I/O devices 504, and memory 506 storing one or more executable modules. A processor 502 may include not only a processing device but accompanying hardware such as buses, internal or external cache, registers, or the like, well-known to those skilled in the art and capable of processing both executable and operational data. Likewise, I/O devices 504 may include input and output devices such as keyboards, mice, scanners, display devices, printers, or the like, in addition to accompanying hardware and software all of which are well known to those skilled in the art. Memory 506 may include devices such as random-access memory, read-only memory, hard drives, tape drives, CDs, DVDs, floppy disks, flash memory, or any other memory or data storage device known to those skilled in the art.

In a selected embodiment, memory 506 may store one or more modules, including but not limited to a parsing module 508, an identification module 510, a determination module 512, a notification module 514, a rectification module 516, and a translation module 518. A parsing module 508 may perform tasks such as reading a section of source code, breaking down the code into intelligible portions, and analyzing its structure. Likewise, an identification module 510 may identify statements, such as instructions or directives, which reference a base register for address resolution according to base-displacement or other form. A determination module 512 analyzes the statements to determine whether two or more statements designate the same base register for address resolution.

If two or more statements reference the same base register, a notification module 514 may notify a user or programmer of the conflict. In certain embodiments, the notification module 514 may inform the user of the potential danger and possibly suggest a remedy. Memory 506 may optionally include a rectification module 516 that may resolve the conflict, for example, by allowing a user to modify a statement such that it references another base register. Once the source code is free of conflicts, a translation module 518 may translate the source code into machine or object code such that it may be executed by a processor 502.

Figure 6:
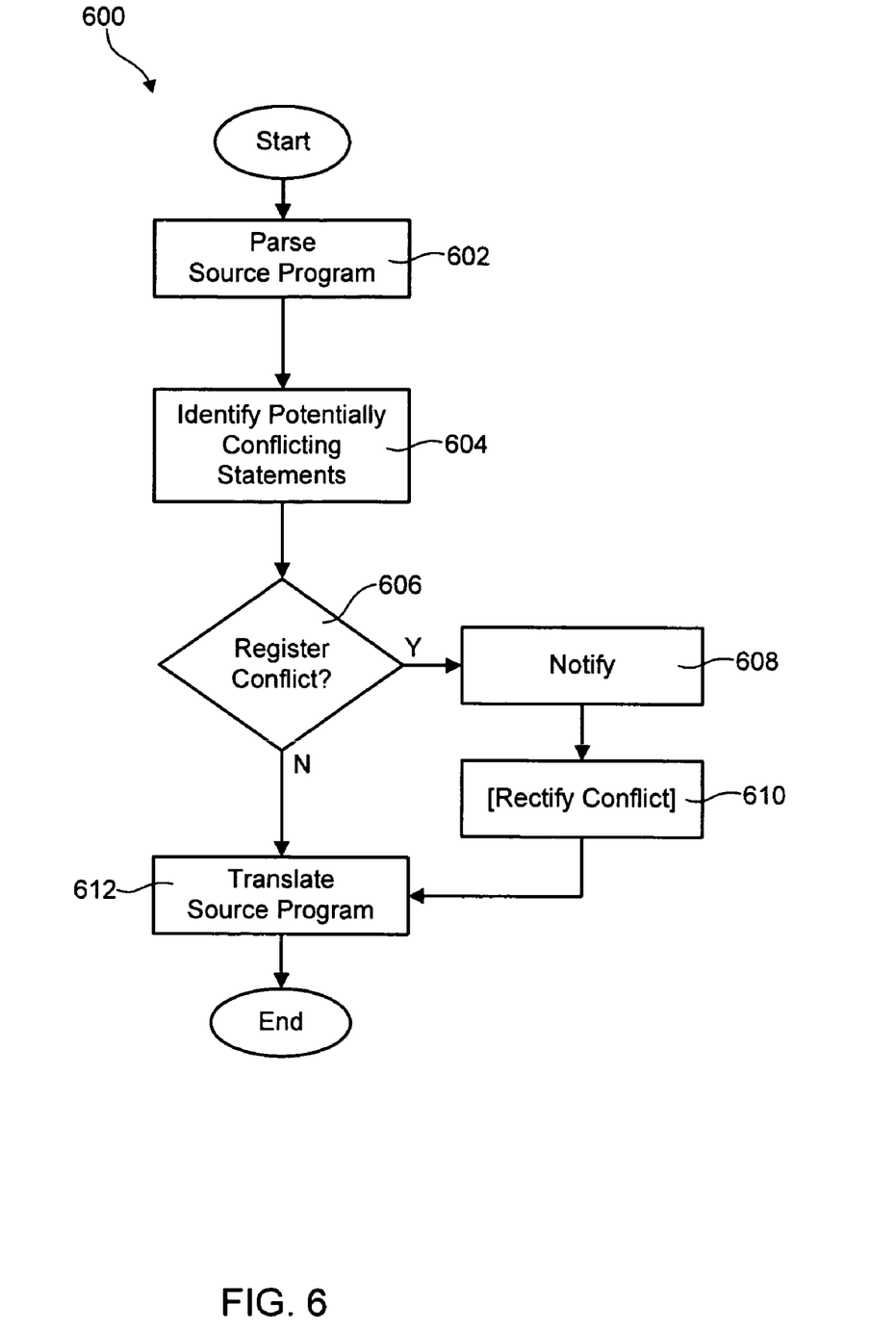
FIG. 6 is a flow chart illustrating one embodiment of a method for detecting base-register usage conflicts in accordance with the invention.

Referring to FIG. 6, in selected embodiments, a method 600 in accordance with the invention may include parsing 602 a section of source code by reading and analyzing the structure of the source code. During this parsing process 602, statements that designate the same base register for address resolution may be identified 604. At a decision step 606, if a conflict exists, the method 600 may notify 608 the user of the conflict. Optionally (indicated by the brackets in FIG. 6), the method 600 may include a step to rectify 610 the problem. Once the conflict is resolved or, alternatively, if no conflict is identified, the source code may be translated 612 into executable machine code.

Figure 7:
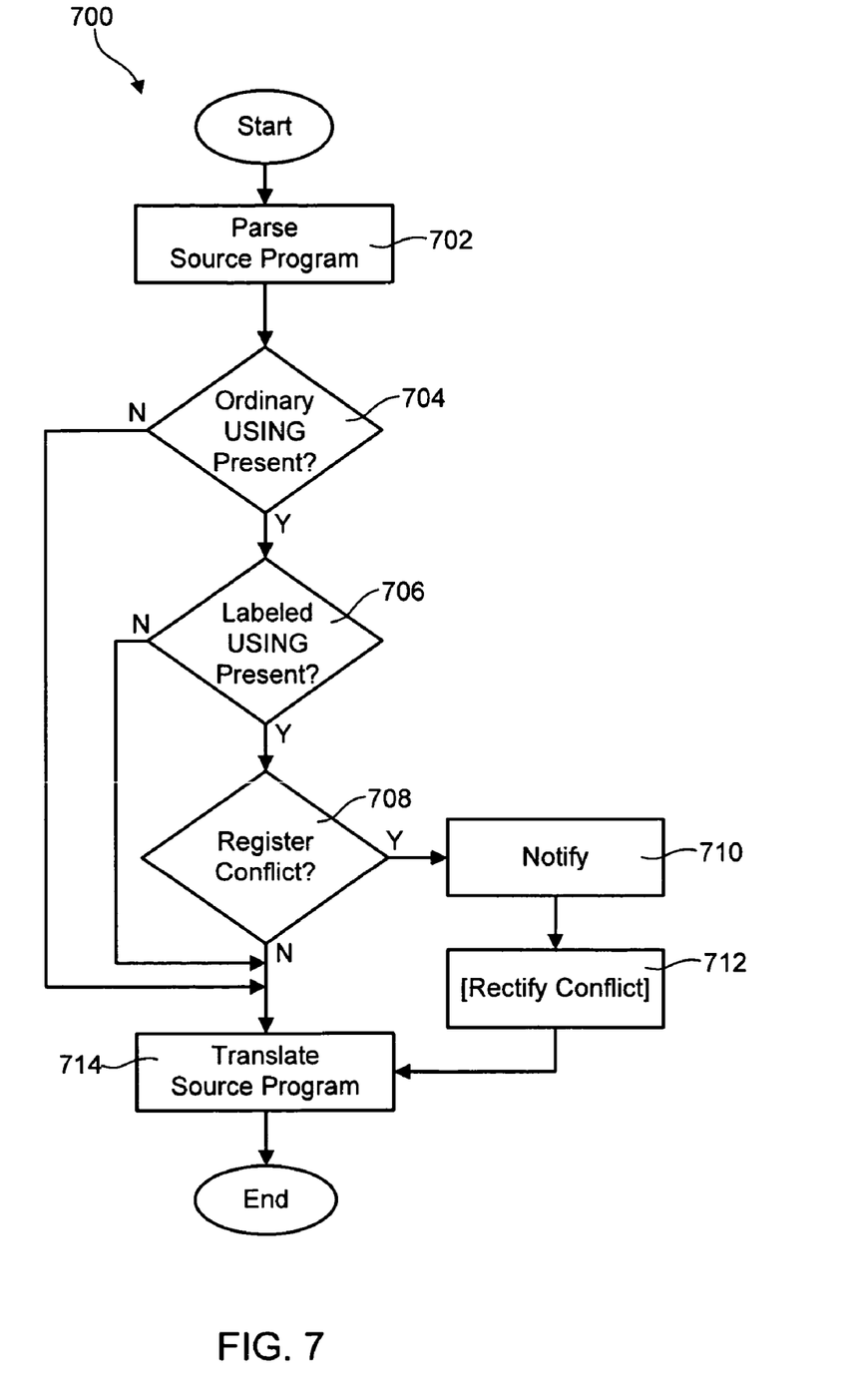
FIG. 7 is a flow chart illustrating a more particular embodiment of a method for detecting base-register usage conflicts involving an ordinary and a labeled USING statement.

Referring to FIG. 7, in a more particular embodiment applicable to IBM's HLASM, a method 700 in accordance with the invention may include parsing 702 a section of source code by reading and analyzing its structure. If an ordinary USING statement is detected at a decision step 704, the method 700 may then test whether a labeled USING statement is present at decision step 706. If, on the other hand, an ordinary USING statement is not detected at decision step 704, there is likely no base-register conflict and the source code may then be translated 714 into executable machine code. If a labeled USING statement is detected at decision step 706, the method 700 may then proceed to decision step 708. If, however, a labeled USING statement is not present, there is likely no conflict and the source code may then be translated 714 into machine code.

At decision step 708, the method 700 tests whether a conflict exists due to the ordinary and labeled USING statements referencing the same base register. If a conflict exists, the method 700 notifies 710 a user of the conflict and optionally rectifies 712 the conflict. Once the conflict is resolved, the source code may then be translated into executable machine code. Likewise, if there are no base-register conflicts detected at decision step 708, corrective action is unlikely to be required and the method 700 may then proceed by translating 714 the source code into machine code. Although base-register usage conflicts will most likely occur between ordinary and labeled USING statements that reference the same base register, a conflict may also occur with dependent and labeled dependent USING statements, and more particularly with labeled dependent USING statements. Thus, although not illustrated, selected embodiments may also test for conflicts involving these statements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting base-register usage conflicts in computer code, the apparatus comprising:
   a processor coupled to a memory, the memory comprising
      a parsing module configured to parse assembly source code, the assembly source code configured to operate on a High Level Assembler (HLSAM) assembler;
      an identification module configured to identify a first assembly source code statement and a second assembly source code statement, each assembly source code statement comprising an assembly programmer coded assembly directive referencing a base register for address resolution according to base-displacement form, the base-displacement form comprising an addressing methodology used by an assembler to compute base-displacement resolutions within object code by calculating displacements relative to an address stored in a base register;
      a determination module configured to determine whether a base register for the first assembly source code statement matches the base register for the second assembly source code statement, wherein the first assembly source code statement is an ordinary USING assembly source code statement and the second assembly source code statement is a labeled USING assembly source code statement, the ordinary USING assembly source code statement and labeled USING assembly source code statements tracked in a common base-register table;
      a notification module configured to notify an assembly programmer in response to the first assembly source code statement and second assembly source code statement referencing the same base register; and
      a rectification module configured to modify an assembly source code statement such that the assembly source code statement references another base register in response to an acknowledgement of a base register conflict by the assembly programmer which provides the another base register for use in one of the first assembly source code statement and second assembly source code statement.

2. The apparatus of claim 1, further comprising a translation module configured to convert the source code into object code.

3. The apparatus of claim 1, further comprising a rectification module to initiate corrective action in response to the first assembly source code statement and second assembly source code statement referencing the same base register.

4. The apparatus of claim 1, wherein the determination module determines whether the base register of the first assembly source code statement matches the base register of the second assembly source code statement at the time the source code is translated into object code.

5. The apparatus of claim 1, wherein the notification module is further configured to suggest a possible remedy to the assembly programmer in response to the first assembly source code statement and second assembly source code statement referencing the same base register.

6. A method for detecting base-register usage conflicts in computer code, the method comprising:
   parsing assembly source code by way of a processor and a memory, the assembly source code configured to operate on a High Level Assembler (HLSAM) assembler;
   identifying a first assembly source code statement and a second assembly source code statement, each assembly source code statement comprising an assembly programmer coded assembler directive referencing a base register for address resolution according to base-displacement form, the base-displacement form comprising an addressing methodology used by an assembler to compute base-displacement resolutions within object code by calculating displacements relative to an address stored in a base register;
   determining that the first assembly source code statement is an ordinary USING assembly source code statement and the second assembly source code statement is a labeled USING assembly source code statement such that a potential base register conflict exists, the ordinary USING assembly source code statement and labeled USING assembly source code statements tracked in a common base-register table;

determining whether a base register for the first assembly source code statement matches the base register for the second assembly source code statement;

notifying an assembly programmer in response to the first assembly source code statement and second assembly source code statement referencing the same base register;

prompting the assembly programmer to provide another base register for use in one of the first assembly source code statement and second assembly source code statement, the assembly programmer identifying that a same base register reference conflict exists;

modifying an assembly source code statement such that the assembly source code statement references the another base register in response to the assembly programmer providing the another base register for use in one of the first assembly source code statement and second assembly source code statement.

7. The method of claim 6, further comprising suggesting a possible remedy to the assembly programmer in response to the first assembly source code statement and second assembly source code statement referencing the same base register.

8. The method of claim 6, further comprising determining whether the base register of the first assembly source code statement matches the base register of the second assembly source code statement at the time the source code is translated into object code.

9. A system for detecting base-register usage conflicts in computer code, the system comprising:

a processor for processing executable and associated operational data; and a memory device in communication with the processor for storing the executable and associated operational data, wherein the operational data comprises:

a parsing module to parse assembly source code, the assembly source code configured to operate on a High Level Assembler (HLSAM) assembler;

an identification module to identify a first assembly source code statement and a second assembly source code statement, each assembly source code statement comprising an assembly programmer coded assembler directive referencing a base register for address resolution according to base-displacement address form, the base-displacement form comprising an addressing methodology used by an assembler to compute base-displacement resolutions within object code by calculating displacements relative to an address stored in a base register;

a determination module to determine whether a base register of the first assembly source code statement matches the base register of the second assembly source code statement, wherein the first assembly source code statement is an ordinary USING assembly source code statement and the second assembly source code statement is a labeled USING assembly source code statement, the ordinary USING assembly source code statement and labeled USING assembly source code statements tracked in a common base-register table;

a notification module to notify an assembly programmer in response to the first assembly source code statement and second assembly source code statement referencing the same base register;

a rectification module configured to modify an assembly source code statement such that the assembly source code statement references another base register in response to an acknowledgement of a base register conflict by the assembly programmer which provides the another base register for use in one of the first assembly source code statement and second assembly source code statement.

10. The system of claim 9, further comprising a translation module configured to convert the source code into object code.

11. The system of claim 9, wherein the notification module is further configured to suggest a possible remedy to the assembly programmer in response to the first assembly source code statement and the second assembly source code statement referencing the same base register.

\* \* \* \* \*